United States Patent
Yang et al.

(10) Patent No.: US 9,068,084 B2
(45) Date of Patent: Jun. 30, 2015

(54) SILICA NANOPARTICLES DOPED WITH DYE HAVING NEGATIVE CHARGE AND PREPARING METHOD THEREOF

(75) Inventors: Wensheng Yang, Changchun (CN); Jinglun Liang, Changchun (CN); Jun Li, Changchun (CN)

(73) Assignee: Wuxi Zodolabs Biotech Co., Ltd. (CN)

( * ) Notice: Subject to any disclaimer, the term of this patent is extended or adjusted under 35 U.S.C. 154(b) by 386 days.

(21) Appl. No.: 13/574,171

(22) PCT Filed: Feb. 11, 2010

(86) PCT No.: PCT/CN2010/070648
§ 371 (c)(1),
(2), (4) Date: Jul. 19, 2012

(87) PCT Pub. No.: WO2011/088627
PCT Pub. Date: Jul. 28, 2011

(65) Prior Publication Data
US 2012/0292572 A1    Nov. 22, 2012

(30) Foreign Application Priority Data

Jan. 19, 2010   (CN) .......................... 2010 1 0001649

(51) Int. Cl.
*C09K 11/06*       (2006.01)
*C01B 33/12*       (2006.01)
(Continued)

(52) U.S. Cl.
CPC . *C09C 1/30* (2013.01); *C09K 11/02* (2013.01); *C09K 11/06* (2013.01);
(Continued)

(58) Field of Classification Search
USPC .............. 252/301.16; 428/402.2, 402.24, 404
See application file for complete search history.

(56) References Cited

U.S. PATENT DOCUMENTS

2004/0101822 A1    5/2004   Wiesner
(Continued)

FOREIGN PATENT DOCUMENTS

| CN | 1742094 A | 3/2006 |
|---|---|---|
| CN | 1767941 A | 5/2006 |

(Continued)

OTHER PUBLICATIONS

International Search Report counterpart Application No. PCT/CN2010/070648, mailed by the Patent Office of China on Nov. 11, 2010.
(Continued)

*Primary Examiner* — Carol M Koslow
(74) *Attorney, Agent, or Firm* — James E. Walton; Damon R. Hickman

(57) ABSTRACT

Provided are silica nanoparticles doped with dyes having a negative charge by using cationic polyelectrolyte as templet and preparing method thereof. The nanoparticles have a core-shell structure, inner core comprises cationic polyelectrolyte aggregates, in which fluorescent dye having a negative charge and SiO2 are doped, and optional additive having a negative charge, the shell is consisted of SiO2, wherein the sum of negative charge carried by the additives and the fluorescent dye is less than that of positive charge carried by the polyelectrolyte aggregates. The preparing method comprises the following steps: preparing complex solution of polyelectrolyte and fluorescent dye; prehydrolysis of organosilicon source; coating with organosilicon source. The method can be applied to dope silica with various fluorescent dyes having a negative charge. Various dyes can be doped at the same time, the doping amount, and particle diameter and shape of the product can be controlled by the method. The nanoparticles are spherical, the particle diameter thereof is uniform, and colloid formed therefrom is stable.

21 Claims, 5 Drawing Sheets

(51) Int. Cl.
  *C09C 3/10*      (2006.01)
  *C09C 1/30*      (2006.01)
  *C09K 11/02*     (2006.01)
  *C01B 33/18*     (2006.01)
  *B82Y 30/00*     (2011.01)

(52) U.S. Cl.
  CPC ........ C09K 2211/1096 (2013.01); C01B 33/18 (2013.01); C01P 2004/04 (2013.01); C01P 2004/34 (2013.01); C01P 2004/51 (2013.01); C01P 2004/52 (2013.01); C01P 2004/84 (2013.01); C01P 2004/64 (2013.01); B82Y 30/00 (2013.01)

(56) References Cited

U.S. PATENT DOCUMENTS

| | | |
|---|---|---|
| 2006/0183246 A1 | 8/2006 | Wiesner |
| 2007/0104649 A1* | 5/2007 | Fischer et al. ............... 424/9.6 |
| 2010/0035365 A1 | 2/2010 | Wiesner |
| 2010/0040693 A1 | 2/2010 | Chung |

FOREIGN PATENT DOCUMENTS

| | | |
|---|---|---|
| CN | 1782020 A | 6/2006 |
| CN | 101003729 A | 7/2007 |
| CN | 101050358 A | 10/2007 |
| CN | 101387639 A | 3/2009 |
| CN | 101463252 A | 6/2009 |
| JP | 2006514708 A | 5/2006 |
| JP | 2006517985 A | 8/2006 |
| JP | 20100700768 A | 4/2010 |
| KR | 20050103186 A | 10/2005 |
| KR | 20050109455 A | 11/2005 |
| KR | 20080013510 A | 2/2008 |
| WO | 2004063387 A1 | 7/2004 |
| WO | 2004074504 A1 | 9/2004 |
| WO | 2007002690 A2 | 1/2007 |
| WO | WO 2007/002690 * | 1/2007 |
| WO | 2008018716 A1 | 2/2008 |

OTHER PUBLICATIONS

Wang, "Template Synthesis of Nanostructured Materials via Layer-by-Layer Assembly," Chem. Mater., 20, 848-858, 2008.

Larson, "Silica Nanoparticle Architecture Determines Radiative Properties of Encapsulated Fluorophores," Chem. Mater., 20, 2677-2684, 2008.

Vanblaaderen, "Synthesis and Characterization of Monodisperse Colloidial Organo-silica Spheres," Journal of Colloid and Interface Science, 156, 1-18, 1993.

Tedeschi, "Adsorption and Desorption Behavior of an Anionic Pyrene Chromophore in Sequentially Deposited Polyelectrolyte-Dye Thin Films," J. Am. Chem. Soc., 122, 5841-5848, 2000.

Vanblaaderen, "Synthesis and Characterization of Colloidal Dispersions of Fluorescent, Monodisperse Silica Spheres," Langmuir, 8, 2921-2931, 1992.

Rossi, "Stober Synthesis of Monodispersed Luminescent Silica Nanoparticles for Bioanalytical Assays," Langmuir, 21, 4277-4280, 2005.

Tao, "Enhanced accumulation and visible light-assisted degradation of azo dyes in poly(allylamine hydrochloride)-modified mesoporous silica spheres," Materials Research Bulletin 44, 306-311, 2009.

Hooisweng OW, "Bright and Stable Core-Shell Fluorescent Silica Nanoparticles," Nano Letters, vol. 5, No. 1 113-117, 2005.

* cited by examiner

US 9,068,084 B2

SILICA NANOPARTICLES DOPED WITH DYE HAVING NEGATIVE CHARGE AND PREPARING METHOD THEREOF

TECHNICAL FIELD

This invention relates to the technical field of luminescent nano-material, in particular relates to silica nanoparticles doped with negative charged dye using positively charged polyelectrolyte as templet and preparing method thereof.

BACKGROUND TECHNOLOGY

Dye-doped silica nanoparticles are widely used in fields of biology, medicine and theoretical research on photo-physical chemistry and so on. Various properties of silica can be improved by doping it with fluorescent dyes: dyes fixed in the media of silica can be isolated from solvents and oxygen so that its dispersibility and optical stability can be improved (Nano Letter 2005, 15, 113-117); the microenvironment of dyes can be changed by adjusting the particle structure of silica so as to improve the luminescent efficiency and service life (Chem. Mater., 2008, 20, 2677-2684); and $SiO_2$ is innoxious, chemically inert, prone to be surface functionalized, so as to expand the applied range of fluorescent dyes.

There is an urgent technical problem needs to be solved, that is realizing doping dye molecules inside the silica particles stably without any leakage. Van Blaaderen et al. use silane coupling agent (Langmuir 1992,8,2921-2931; J Colloid Interface Sci. 1993, 156, 1-18; Nano, Lett. 2005, 5, 113-117) to anchor the dye molecular inside the silica nanoparticles by means of covalent coupling method. The method requires the dye molecular have functional groups reacting with silane coupling agent, which reduces the types of doped dyes to a limited number, therefore is not universally applicable. Rosenzweig et al. utilize electrostatic interactions (Langmuir 2005, 21, 4277-4288), so as to realize doping positively charged dyes inside silica. However, because silica media carries negative charges, the method is not suitable for negatively charged dyes.

Positively charged polyelectrolyte can be both absorbed on the surface of silica and filled into the pore canal of mesoporous silica material. The nanoparticles of silica modified by positively charged polyelectrolyte can absorb negatively charged dyes, which makes silica have specific optical performances (Chem. Mater. 2008, 20, 848-858), and widely applied in the research of photophysics (J. Am. Chem. Soc. 2000, 122, 5841-5848) and photochemistry (Mater. Res. Bull. 2009, 44, 306-311) of the dyes. However, the particles of $SiO_2$ merely act as carriers and can not protect dyes.

SUMMARY OF THE INVENTION

The technical problem to be solved in the invention is to overcome the deficiencies in the background technology, i.e., to prepare silica nanoparticles doped with dye having negative charge using positively charged polyelectrolyte as template, which have a core-shell structure; to provide a simple yet effective way to dope negatively charged fluorescent dye in the silica by using electrostatic force; to realize doping various dyes in the same time, keeping the doping amount, and particle diameter and morphology of products under control.

Firstly, by means of electrostatic force, negatively charged fluorescent dye is homogeneously dispersed in the positively charged polyelectrolyte aggregates, so as to form a composite of fluorescent dye and polyelectrolyte. Then, the compound is introduced into a prehydrolysed Stöber system, so as to absorb the silica onto the polyelectrolyte aggregate and make it grow. The detailed steps include: 1. preparation of the composite solution of polyelectrolyte and negatively charged fluorescent dye; 2. predydrolysis of organosilicon source; 3. mixing of the composite solution comprising polyelectrolyte and negatively charged fluorescent dye and the prehydrolised system (Stöber system) of organosilicon source; 4. organosilicon source absorption and condensation of the hydrolysed organosilicon source, so as to form silica particles doped with negatively charged dyes.

The silica nanoparticles doped with negatively charged dyes using positively charged polyelectrolyte as templet in the invention have a core-shell structure, inner core comprises positively charged polyelectrolyte aggregates, in which negatively charged fluorescent dye and silica are doped, and optional negatively charged additive, the shell is consisted of $SiO_2$, wherein the sum of the amount of negative charge carried by the additives and the fluorescent dye is less than that the amount of positive charge carried by the polyelectrolyte aggregates.

Said polyelectrolyte aggregate refers to quaternary amine polyelectrolyte with positively charged radicals, such as poly (diallyl dimethyl ammonium chloride) (PDADMAC), poly-quaternary ammonium salt-7 (copolymer of diallyl dimethyl ammonium chloride and acrylamide), poly-quaternary ammonium salt-2 (poly quaternary polymer containing uramido). The molecular weight of quaternary amine polyelectrolyte with positive charged radicals is generally 100,000-500,000 Dalton (Da).

Said fluorescent dye is organic dye with negatively charged groups, wherein the negatively charged group mainly refers to sulfogroup, carboxyl, hydroxyl, etc. The fluorescent dye includes 8-hydroxy-1,3,6-pyrene trisulfonate (HPTS), 7-hydroxy coumarin 4-acetic acid (7-HCA cpd), fluorescein sodium salts (FL), Sulforhodamine 101, etc. The invention can realize doping various dyes at the same time. In the invention, the method for preparing the silica nanoparticles doped with negatively charged fluorescent dyes by using positively charged polyelectrolyte as template comprises the steps of preparing composite solution of the polyelectrolyte and fluorescent dyes, the prehydrolysis of organosilicon source, and coating with the organosilicon source. The detailed procedure is shown in FIG. 9.

Said preparation process of the composite solution of the polyelectrolyte and fluorescent dyes includes introducing polyelectrolyte solution into an ethanol/water mixture, adding fluorescent dye solution under magnetic agitation, and keeping agitating for appropriate period so as to obtain the composite solution of polyelectrolyte and fluorescent dye. Preferably, both the polyelectrolyte and the fluorescent dye are either aqueous solution or ethanol solution, the volume ratio of ethanol to water in the composite solution of the polyelectrolyte and fluorescent dyes is from 7 to 10 and mass concentration of the polyelectrolyte in is 0.1~0.4 mg/ml.

Said prehydrolysis process of organosilicon source includes introducing ethanol, water and ammonia water into another container, adding siloxane under magnetic agitation and reacting for an appropriate period so as to obtain a prehydrolysis system of organosilicon source. Preferably, the molar ratio of ethanol, water, ammonia water and siloxane in the system is 161:55:1.5:1~2.

Said coating process with organosilicon source includes introducing the composite solution of polyelectrolyte and fluorescent dye into the prehydrolysis system of organosilicon source, and agitating for appropriate period so as to obtain silica nanoparticles doped with negatively charged fluorescent dyes using positively charged polyelectrolyte as template. Preferably, the amount of siloxane in the prehydrolysis system, based on molar ratios, is 720~1440 times of the polyelectrolyte in the composite solution added, i.e. the ratio of siloxane in the prehydrolysis system and the polyelectrolyte repeating unit in the added composite solution containing fluorescent dyes is 720~1440:1.

The degree of ionization of polyelectrolyte aggregate of quaternary ammonium salt does not be affected by pH value of the system. Even under alkaline condition, it still keeps characteristic of positive charge and functions as a bridge between soluble silicate oligomer and negatively charged fluorescent dyes. The adopted solvent ethanol, is a poor solvent for polyelectrolyte, in which polyelectrolyte exists in form of contracted aggregates, the shape of which is similar as spherical.

The volume ratio of ethanol to water in the composite solution of the polyelectrolyte and fluorescent dye is 7~10, which is similar to that of Stöber system, may avoid the influence caused by addition of polyelectroyte template, and improve parallelity and regulatability of experiments. Upon mixing of the polyelectrolyte and the fluorescent dye, agitating for 10~20 minutes so as to ensure a homogeneous dispersion of the fluorescent dye in the polyelectrolyte, and avoid overly high local concentration of fluorescent dye. The mass concentration of polyelectrolyte in the composite solution should be no more than 0.4 mg/ml, preferably 0.2 mg/ml, so as to avoid congregation of the templates due to crosslinking among molecules.

In the composite solution of polyelectrolyte and fluorescent dye, the maximum value of the molar ratio of fluorescent dye to polyelectrolyte (the ratio of the sum of the amount of negative charges carried by fluorescent dye to the amount of positive charges carried by polyelectrolyte) should ensure electrostatic charge of the composite formed by mixing the two be zero, where congregation would happen in the composite of polyelectrolyte and fluorescent dye for lack of enough electrostatic repulsion. There is no minimum amount for dyes, and commonly any number above zero can be adopted. In order to make the composite template absorb sufficient silica, the ratio of the sum of the amount of negative charges carried by the fluorescent dye to the amount of the positive charges carried by the polyelectrolyte is preferably no more than 0.62:1. However, the less amount the dye is used, the less uniform the morphology of the formed particles is (see FIGS. 1 and 2). When the molar ratio of charges of fluorescent dye to polyelectrolyte is no less than 0.25, the positive charges of polyelectrolyte is partially neutralized, so that the congregation can be avoided and spherical silica nanoparticles with uniform morphology can be obtained. If want to dope dye with a molar ratio of less than 0.25 and good uniformity is required, negatively charged additives could be added to make the total charge ratio be no less than 0.25, which can also realize avoiding dyes from congregating.

Stöber system refers to a system of silica nanoparticles formed by utilizing hydrolysis and condensation of organosilicon source in an ethanol/water mixture with $NH_3$ as catalyst, wherein, the organosilicon source is siloxane, e.g. tetroethyl orthosilicate (TEOS); the alcohol in the ethanol/water mixture could be fatty alcohol such as methanol and ethanol. In order to make coating process carry out in a relatively mild condition, the concentration of $NH_3$ in the prehydrolysis system is preferably low to 0.14 M (mol/L). The reason is that where the concentration of ammonium water is high, velocity of hydrolysis and condensation of TEOS is very quick, and the silica nanoparticles are produced in the system quickly. As soon as the polyelectrolyte is added, flocculent precipitate appears immediately, and it is the polyelectrolyte that induces the congregation of silica. Where the concentration of ammonium water is low, TEOS hydrolyses and condenses relatively slowly with its hydrolysis products being relatively small oligomers (generally referred to soluble silica) in the first place, which are not prone to congregate, but attach to the aggregates of polyelectrolyte, making its electric potential reversed so as to realize stability of the colloid.

In the precondition of ensuring stability of the colloid, where the organosilicon source itself grows faster than the organosilicon source attached to the aggregates of polyelectrolyte, self-nucleation will happen. In the Stöber system, the molar ratio of ethanol, water, ammonium water, siloxane is preferably 161:55:1.5:1~2, so as to avoid self-nucleation phenomenon.

Stable coating of the composite of polyelectrolyte and fluorescent dye needs a shortest prehydrolysis time. As shown in table 1, the numbers of 0.062, 0.25 and 0.5 in each line represent the molar ratio of charges of the fluorescent dye to that of polyelectrolyte, wherein x represents flocculent, and √ represents normal.

TABLE 1

|       | 0 min | 8 min | 14 min | 15 min | 16 min | 20 min | 25 min |
|-------|-------|-------|--------|--------|--------|--------|--------|
| 0.062 | x     | x     | x      | x      | x      | ✓      | ✓      |
| 0.25  | x     | x     | x      | x      | ✓      | ✓      | ✓      |
| 0.5   | x     | x     | x      | ✓      | ✓      | ✓      | ✓      |

It could be known from table 1, the more the fluorescent dye is absorbed, the shorter the prehydrolysis time is needed. Where the prehydrolysis time is shorter than the shortest time, the amount of soluble silica oligomers in the system is too low to make the electric potentials of the composite of polyelectrolyte and fluorescent dye reverse so as to make the templates congregate; while, where the prehydrolysis time is longer than the shortest time, the electric potentials reverse quickly after polyelectrolyte template absorbs soluble silicon (see FIG. 3), and the soluble silicon further attaches and grows to the inside of the polyelectrolyte aggregate and then on the surface thereof, so as to form the silica nanoparticles doped with negatively charged fluorescent dyes after 24 hours. However, where prehydrolysis time is too long, the silica itself will form relatively large particle, which would influence the coating to the template. Where the concentration of $NH_3$ in the prehydrolysis system is 0.14 M, the prehydrolysis time of TEOS could be 15~25 minutes.

In the process of coating with organosilicon source, the agitation speed is preferably less than 100 rpm, which aims to prevent the polyelectrolyte-dye composite from congregating due to over quick agitation. The total reaction time (starting from prehydrolysis of organosilica source to the end of reaction) is generally 24 hours, so as to ensure a complete synthetic reaction.

The particles formed finally have a core-shell structure. Due to the limitation of existing analyzing means, the interface between the core and shell is hard to determine accurately, therefore qualitative analysis is the only option to reach a conclusion. After introducing the polyelectrolyte into the Stöber prehydrolysis system, the electric potential is reduced to its minimum after 20 minutes or so and remains unchanged, i.e. the negatively charged silica completes absorption to the polyelectrolyte. The state of the particles can be observed through electron microscope (see FIG. 4), and it could be deemed that the size of the particle is nearly that of the core. The components of core are polyelectrolyte, negatively charged dye and $SiO_2$. The shell layer that grows later is a sheer silica layer.

The particle size of final product depends on the molecular weight of the polyelectrolyte. Larger molecular weight results in larger aggregate and larger particle size of the final product. Being used as template, the PDADMAC with the molecular weight of 100,000~200,000 Da can form product with its particle size being 40~70 nm, whereas the PDADMAC with the molecular weight of 400,000~500,000 Da is used, the particle size of final product could be 80~120 nm. The added amount of TEOS can change the thickness of $SiO_2$ shell outside the template. The more the TEOS is added, the thicker the silica shell is. Re-growth method could be adopted, by means of adding TEOS many times, so as to make the $SiO_2$ shell grow.

The congregation of template may result in nonuniform morphology and particle size of the final particles. By increasing the dosage of fluorescent dye, the surface electric potential of the template will approach zero, which allows the templates go through the equipotential point more quickly, so that the congregation of templates can be reduced (see FIGS. 1 and 2). Furthermore, additives, such as EDTA or its sodium salts, citric acid or its sodium salts, could be added into the composite solution of the polyelectrolyte and fluorescent dye, to take the place of negatively charged fluorescent dye in reducing the electric potential of templates and realizing the effect of decreasing the congregation of template, so as to obtain product of uniform particles. In the same token, the total mole number of negative charges carried by the additives and the fluorescent dye should be less than the mole number of the positive charges carried by polyelectrolyte. Generally, the ratio of the positive charge carried by fluorescent dye and additives to the negative charges carried by polyelectrolyte could be set between 0~1. In order to ensure the sufficient absorption of $SiO_2$, the ratio is preferably no more than 0.62:1, more preferably 0.25~0.62:1. Example 19 is carried out under the same condition as FIG. 2, except further addition of disodium EDTA, which set the ratio of the negative charges carried by disodium EDTA and fluorescent dye to the positive charges carried by the polyelectrolyte as 0.5. Its final particles are shown in FIG. 5, and it could be observed that its morphology has been improved as compared to FIG. 2 with its particle size being remarkably reduced.

Taking example 19 as an example, the methods for calculating the doping amount and total molar ratio of charges are as follows:

1) The mole number of positive charges of polyelectrolyte:
the mass of added PDADMAC: 20 μl×10 mg/ml=0.2 mg
the mole mass per unit of PDADMAC M=161.5 g/mol
therefore, the mole number of positive charges unit of added PDADMAC:
0.2 mg/161.5 g/mol=1.238×10$^{-6}$ mol
For each unit of PDADMAC has one positively charged quaternary ammonium group, the mole number of added positive charges is 1.238×10$^{-6}$ mol.

2) The mole number of negative charges of dye HPTS is:
Mass of added HPTS=10μl×1 mg/ml=0.01 mg
Mole mass of HPTS M=524.39 g/mol
So, mole number of added HPTS=0.01 mg/524.39 g/mol=1.91×10$^{-8}$ mol
Each molecule of HPTS has four negative charges, so the total mole number of negative charges is:
1.91×10$^{-8}$ mol×4 =7.64×10$^{-8}$ mol 3) Mole number of negative charges of added disodium EDTA:
Mass of added disodium EDTA=330 μl/5×0.75 mg/ml=0.0495 mg
Mole mass of disodium EDTA M=372.24 g/mol
So, mole number of added disodium EDTA is 0.0495 mg/372.24 g/mol=1.33×10$^{-7}$ mol
Each of the disodium EDTA molecule has four negative charges, so the total mole number of negative charges is:
1.33×10$^{-7}$ mol×4=5.32×10$^{-7}$ mol 4) The total mole number of negative charges is 7.64×10$^{-8}$ mol+5.32×10$^{-7}$ mol=6.08×10$^{-7}$ mol
the total mole number of positive charges is 1.238×10$^{-6}$ mol Therefore, the molar ratio of negative charges to positive charges in example 19 is 0.49≈0.5, whereas the doping amount of the fluorescent dye is 0.062.

The intensity of electrostatic interaction between positive charge groups of polyelectrolyte and negative charge groups of fluorescent dye decides the doping amount of fluorescent dye (the charge molar ratio of fluorescent dye to polyelectrolyte in the composite solution of the two) in the silica medium. The fluorescent dye with sulfonic group has a strong interaction with polyelectrolyte, and can be doped at any amount within the saturation volume of charges, whereas the fluorescent dye with carboxylic group has a relatively weak interaction with polyelectrolyte, which will result in the reduction of maximum doping amount. The fluorescent dye only with carboxylic group has a very weak acidity, which releases a rather small amount of negative ions in the ethanol solvent, therefore has a weak interaction with the polyelectrolyte leading to an even smaller doping amount.

Electrostatic force is non-selective, with which various negative charged dyes being simultaneously doped inside of inner core of the polyelectrolyte can be achieved. Furthermore, the invention can be used in cooperation with other doping method. For example, in the growing process of the shell, electrostatic force (see FIG. 8) or covalent coupling can be used to dope other dyes, so as to realize layered doping of all the dyes once only. The silica system doped with various dyes provides a simple and convenient modeling platform for researches such as energy transferring, multi-color doping.

The method of the invention can be used in cooperation with doping method through electrostatic force of phosphorescent dyes, so as to realize the layered doping of phosphorescent dyes and fluorescent dye. The procedure could be divided into three steps, i.e. the preparation of composite solution of polyelectrolyte and fluorescent dye, the prehydrolysis of organosilicon source and coating with organosilicon source, wherein the first two steps are the same as aforementioned. Said step of coating with organosilicon source is exercised by introducing the composite solution of polyelectrolyte and fluorescent dye into the prehydrolysis system of organosilicon source, reacting while magnetic stirring for 2-8 hours at a speed of less than 100 rpm, then adding positively charged phosphorescent dyes and reacting while magnetic stirring for 24 hours, so as to realize layered doping of fluorescent dyes and phosphorescent dyes.

The method of the invention can be used in cooperation with covalent coupling method, so as to realize the layered doping of different dyes. The procedure could be divided into three steps, i.e. the preparation of composite solution of polyelectrolyte and fluorescent dye, the prehydrolysis of organosilicon source and coating with organosilicon source, wherein the first two steps are the same as aforementioned. Said step of coating with organosilicon source is exercised by introducing the composite solution of polyelectrolyte and fluorescent dye into the prehydrolysis system of organosilicon source, reacting while magnetic stirring for 2-8 hours at a speed of less than 100 rpm, and then adding the precursor solution made from coupling reaction of couplable fluorescent dyes and the silicon coupling agent, keeping reacting while magnetic stirring till the total reaction time reaches 24 hours, so as to realize the layered doping of fluorescent dye and couplable fluorescent dye. The above preparation of precursor solution of couplable dye and silicon coupling agent is well-known in the prior art. Also, the preparation method can be obtained by introducing ethanol solution of silicon coupling agent and couplable fluorescent dye into the water-free ethanol and reacting under obturation condition for 12 hours.

The invention can resolve leakage problems of fluorescent dyes. By means of the electrostatic force between the fluorescent dyes and polyelectrolyte, the fluorescent dyes are bound in the silica medium. As for the fluorescent dyes with sulfonic acid groups (such as HPTS, Sulforhodamine 101), the electric property of them does not change along with the pH value. Therefore, the particles will not leak away as the pH value changes. As for the fluorescent dyes with carboxylic acid radicals or hydroxyl radicals, when they are neutral as pH value of the system decreases, the dyes will not be bound in the silica medium, which may lead to leakage, yet the electrostatic force between the carboxylic acid radicals or hydroxyl radicals and the quaternary ammonium radicals will remarkably reduce their pKa. Taking 7-hydroxy coumarin 4-acetic acid as an example, the pKa value of its hydroxyl radicals in water is 7.8, when it is composited into $SiO_2$ particles according to this invention, pKa will reduce to 4. Therefore, when the pH value of the system is in the range of 4-13, the electrostatic force between hydroxyl radical and quaternary ammonium radical will remain unaffected. No leakage will happen to the negatively charged dyes only with hydroxyl radicals in a system with pH value of 4-13. The pKa of hydroxyl radicals generally will decrease to not more than 2, which can effectively prevent leakage in the range of pH=2-13 in which the silica particles are stable. That is to say, within required range of pH values in biomedicine application, the leakage problems can be completely avoided. Moreover, it could be proven from the experiment, the product particles produced by the invention can be stably dispersed in commonly used biological buffer solutions (such as PBS phosphate buffer solutions, Tris buffer solutions), without any leakage being observed. The above proves, the salts concentration within the range of biological application will not affect the interaction between the dyes and polyelectrolytes, and will not lead to leakage. The colloid stability of the product particles completely meets the needs of biological application.

The method of the invention is universally applicable, and can be used in doping various fluorescent dyes carrying negatively charged groups in silica. Moreover, various dyes can be doped simultaneously, and the doping amount of the dyes and particle size and morphology of the final product can be controlled. The produced silica particles doped with negatively charged dyes are spherical, the particle sizes are uniform and easy to be surface functionalized, and the formed colloid has good stability, which offer more choices for biomedicine, theoretical research, etc.

EMBODIMENTS

Figure 1:
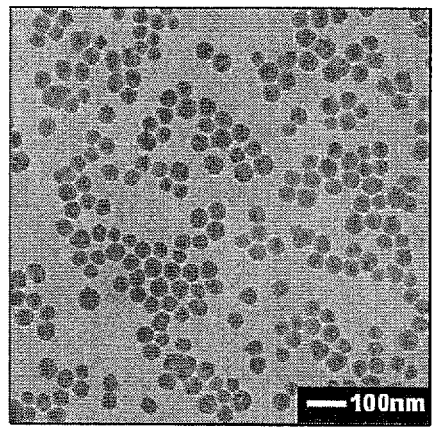
FIG. 1 is a TEM photograph of silica nanoparticles according to example 1 in the invention, which are doped with negatively charged dyes using positively charged polyelectrolyte as template.

The parameters used during the experiment are as follows: (reaction condition: 25° C., under atmosphere pressure)
ethanol, density: 0.79 g/ml, molecular weight: 46 g/mol;
water, density: 1 g/ml, molecular weight: 18 g/mol;
ammonia water, density: 0.91 g/ml, mass percentage 25%, molecular weight of $NH_3$ 17 g/mol;
TEOS, density 0.931 g/ml, molecular weight 208.33 g/mol;
PDADMAC, molar mass of repeating unit 161.5 g/mol.

EXAMPLE 1

0.5 ml ethanol/water mixture (ratio of ethanol to water is 8), 4 ml ethanol and 100 μl PDADMAC aqueous solution (molecular weight is 100,000-200,000 Da) with a concentration of 10 mg/ml are added into a 20 ml glass bottle, and 400 μl HPTS aqueous solution (1 mg/ml) is added while magnetic stirring (at a speed of 500 rpm), the stirring is lasted for 20 minutes to obtain a composite solution of polyelectrolyte and fluorescent dye; 8.4 ml ethanol, 815 μl water and 0.1 ml ammonia water are added into another 20 ml glass bottle, and then 300 μl TEOS is added at magnetic stirring speed of 200 rpm and timing is started. After 25 minutes, 1 ml composite solution of polyelectrolyte and fluorescent dye is added into Stöber system quickly, the magnetic stirring speed is adjusted to 50 rpm when it becomes homogeneous, and the reaction continues till the total reaction time reaches 24 hours. The obtained spherical silica nanoparticles doped with HPTS are uniform with average particle size of 50±5 nm.

FIG. 1 shows a TEM photograph of silica nanoparticles doped with negatively charged dyes using positively charged polyelectrolyte as template according to this example, wherein the charge molar ratio of HPTS to PDADMAC is 0.5.

EXAMPLE 2

2.3 ml ethanol/water mixture (ratio of ethanol to water is 8), 2.4 ml ethanol and 100 μl PDADMAC aqueous solution (molecular weight is 100,000-200,000 Da) with a concentration of 10 mg/ml are added into a 20 ml glass bottle, and 200 μl HPTS aqueous solution (1 mg/ml) is added while magnetic stirring (at a speed of 500 rpm), the stirring is lasted for 20 minutes to obtain a composite solution of polyelectrolyte and fluorescent dye; 8.4 ml ethanol, 815 μl water and 0.1 ml ammonia water are added into another 20 ml glass bottle, and then 300 μl TEOS is added at magnetic stirring speed of 200 rpm and timing is started. After 25 minutes, 1 ml composite solution of polyelectrolyte and fluorescent dye is added into Stöber system quickly, the magnetic stirring speed is adjusted to 50 rpm when it becomes homogeneous, and the reaction continues till the total reaction time reaches 24 hours. The obtained spherical silica nanoparticles doped with HPTS are uniform with average particle size of 50±5 nm.

EXAMPLE 3

3.2 ml ethanol/water mixture (ratio of ethanol to water is 8), 1.6 ml ethanol and 100 μl PDADMAC aqueous solution (molecular weight is 100,000-200,000 Da) with a concentration of 10 mg/ml are added into a 20 ml glass bottle, and 100 μl HPTS aqueous solution (1 mg/ml) is added while magnetic stirring (at a speed of 500 rpm), the stirring is lasted for 20 minutes to obtain a composite solution of polyelectrolyte and fluorescent dye; 8.4 ml ethanol, 815 μl water and 0.1 ml ammonia water are added into another 20 ml glass bottle, and then 300 μl TEOS is added at magnetic stirring speed of 200 rpm and timing is started. After 25 minutes, 1 ml composite solution of polyelectrolyte and fluorescent dye is added into Stöber system quickly, the magnetic stirring speed is adjusted to 50 rpm when it becomes homogeneous, and the reaction continues till the total reaction time reaches 24 hours.

EXAMPLE 4

3.65 ml ethanol/water mixture (ratio of ethanol to water is 8), 1.2 ml ethanol and 100 μl PDADMAC aqueous solution (molecular weight is 100,000-200,000 Da) with a concentration of 10 mg/ml are added into a 20 ml glass bottle, and 50 μl HPTS aqueous solution (1 mg/ml) is added while magnetic stirring (at a speed of 500 rpm), the stirring is lasted for 20 minutes to obtain a composite solution of polyelectrolyte and fluorescent dye; 8.4 ml ethanol, 815 μl water and 0.1 ml ammonia water are added into another 20 ml glass bottle, and then 300 μl TEOS is added at magnetic stirring speed of 200 rpm and timing is started. After 25 minutes, 1 ml composite solution of polyelectrolyte and fluorescent dye is added into Stöber system quickly, the magnetic stirring speed is adjusted to 50 rpm when it becomes homogeneous, and the reaction continues till the total reaction time reaches 24 hours.

Figure 2:
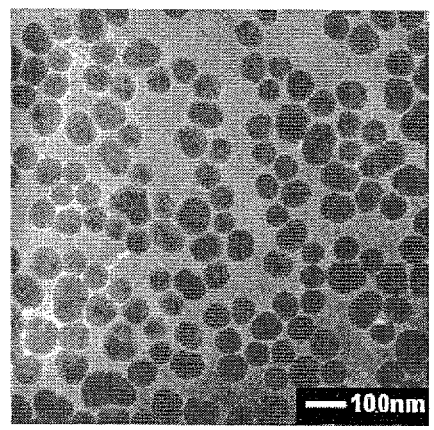
FIG. 2 is a TEM photograph of silica nanoparticles according to example 4 in the invention, which are doped with negatively charged dyes using positively charged polyelectrolyte as template (wherein the charge molar ratio of HPTS to PDADMAC is 0.062).

FIG. 2 shows a TEM photograph of silica nanoparticles doped with negatively charged dyes using positively charged polyelectrolyte as template according to this example, wherein the electric charge molar ratio of HPTS to PDADMAC is 0.062.

Figure 6:
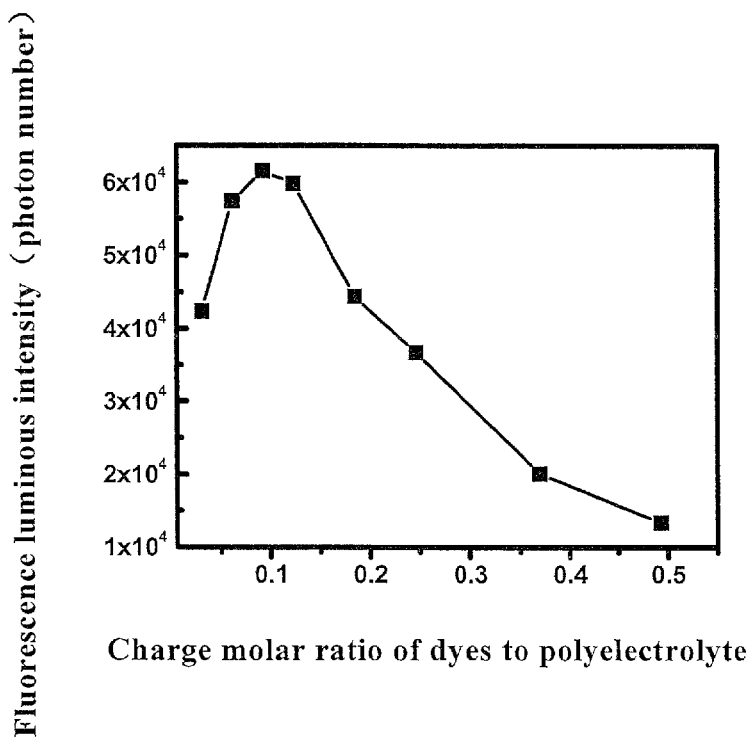
FIG. 6 shows the variation tendency of luminous intensity of product particles with different doping amount of dyes along with charge molar ratio of dye to polyelectrolyte, wherein the charge molar ratios of dye and PDADMAC, from left to right, are respectively: 0.031, 0.062 (example 4), 0.093, 0.123 (example 3), 0.185, 0.25 (example 2), 0.37, 0.5 (example 1).

Examples 1-4 change the doping amount of fluorescent dye. The charge molar ratio of fluorescent dye to polyelectrolyte is 0.5, 0.25, 0.126 and 0.062 respectively. Moreover, the charge molar ratio of fluorescent dye to polyelectrolyte may be any value no more than 0.62:1. Given that other conditions remain the same, variation tendency of the luminous intensity of the produced particles with different doping amount of dyes within such a scope, along with the charge molar ratio of dyes to polyelectrolyte can be seen in FIG. 6.

Figure 3:
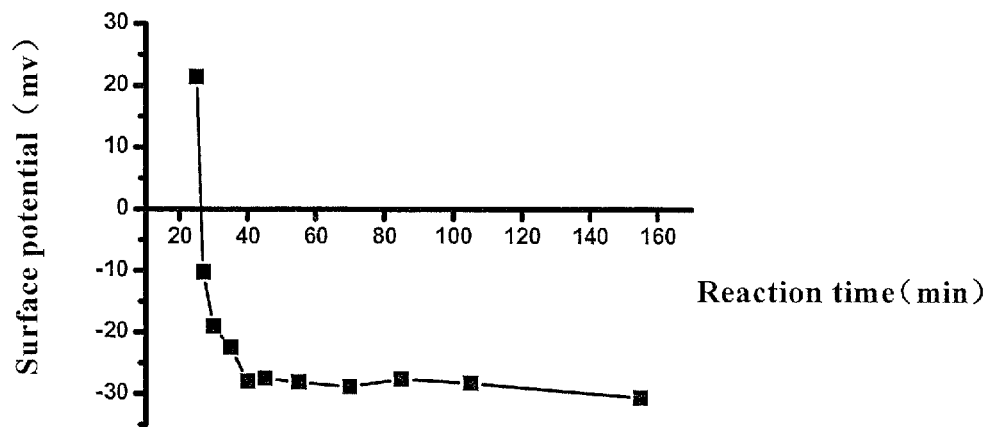
FIG. 3 is a change curve of surface electric potential along with time when positively charged polyelectrolyte template is added after the prehydrolysis of Stöber system lasted 25 minutes (wherein, in the Stöber system: the molar ratio of ethanol, water, ammonia and ethyl orthosilicate is 161:55:1.5:1.5, reaction temperature is 25° C., the charge molar ratio of HPTS and PDADMAC is 0.062, i.e. the system of example 4).
Figure 4:
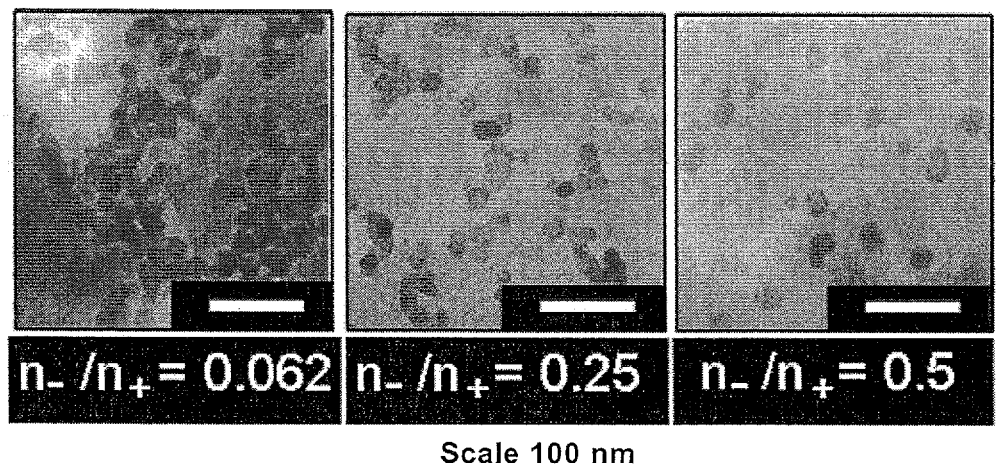
FIG. 4 is the TEM photographs of prehydrolyzed Stöber system taken 20 minutes later after introducing the PDADMAC-HPTS composite with different amount of fluorescent dyes according to examples 4, 2 and 1.

The final particles made from examples 1-4 have a core-shell structure. In examples 1, 2 and 4, after the composite solution of polyelectrolyte and fluorescent dye is added into prehydrolyzed Stöber system, the electric potentials remain basically stable after a decreasing period of 20 minutes (see FIG. 3), indicating that absorption of fluorescent dye and filling of silica into polyelectrolyte aggregate finish at 20 minutes. Through TEM, one can observe morphology of nanoparticles is an approximate spherical particle with its size of about 24 nm (see FIG. 4). The content of dyes has minor effects on the morphology or size of the composite, where the size of the approximate spherical particles can be deemed as that of the core. The shell layer that grows hereafter is a sheer silica layer. Thereby, one can judge the core-shell structure of the final particles.

EXAMPLE 5

2.8 ml ethanol/water mixture (ratio of ethanol to water is 10), 2 ml ethanol and 100 μl PDADMAC aqueous solution (molecular weight is 100,000-200,000 Da) with a concentration of 10 mg/ml are added into a 20 ml glass bottle, and 100 μl HPTS water solution (1 mg/ml) is added while magnetic stirring (at a speed of 500 rpm), the stirring is lasted for 20 minutes to obtain a composite solution of polyelectrolyte and fluorescent dye; 8.4 ml ethanol, 815 μl water and 0.1 ml ammonia water are added into another 20 ml glass bottle, and then 300 μl TEOS is added at magnetic stirring speed of 200 rpm and timing is started. After 25 minutes, 1 ml composite solution of polyelectrolyte and fluorescent dye is added into Stöber system quickly, the magnetic stirring speed is adjusted to 50 rpm when it becomes homogeneous, and the reaction continues till the total reaction time reaches 24 hours.

In examples 3 and 5, the ratios of ethanol to water in the composite solution of polyelectrolyte and fluorescent dye are different, respectively being 8 and 10.

EXAMPLE 6

500 μl ethanol/water mixture (ratio of ethanol to water is 8), 4 ml ethanol and 100 μl PDADMAC aqueous solution (molecular weight is 100,000-200,000 Da) with a concentration of 10 mg/ml are added into a 20 ml glass bottle, and 400 μl aqueous solution of 7-hydroxy coumarin 4-acetic acid ($2 \times 10^{-3}$ M) is added while magnetic stirring (at a speed of 500 rpm), the stirring is lasted for 20 minutes to obtain a composite solution of polyelectrolyte and fluorescent dye; 8.4 ml ethanol, 815 μl water and 0.1 ml ammonia water are added into a 20 ml glass bottle, and then 300 μl TEOS is added at magnetic stirring speed of 200 rpm and timing is started. After 25 minutes, 1 ml composite solution of polyelectrolyte and fluorescent dye is added into Stöber system quickly, the magnetic stirring speed is adjusted to 50 rpm when it becomes homogeneous, and the reaction continues till the total reaction time reaches 24 hours.

EXAMPLE 7

3.2 ml ethanol/water mixture (ratio of ethanol to water is 8), 1.6 ml ethanol and 100 μl PDADMAC aqueous solution (molecular weight is 100,000-200,000 Da) with a concentration of 10 mg/ml are added into a 20 ml glass bottle, and 100

μl fluorescein sodium salts aqueous solution (1 mg/ml) is added while magnetic stirring (at a speed of 500 rpm), the stirring is lasted for 20 minutes to obtain a composite solution of polyelectrolyte and fluorescent dye; 8.4 ml ethanol, 815 μl water and 0.1 ml ammonia water are added into another 20 ml glass bottle, and then 300 μl TEOS is added at magnetic stirring speed of 200 rpm and timing is started. After 25 minutes, 1 ml composite solution of polyelectrolyte and fluorescent dye is added into Stöber system quickly, the magnetic stirring speed is reduced to 50 rpm when it becomes homogeneous, and the reaction continues till the total reaction time reaches 24 hours.

EXAMPLE 8

3.65 ml ethanol/water mixture (ratio of ethanol to water is 8), 1.2 ml ethanol and 100 μl PDADMAC aqueous solution (molecular weight is 100,000-200,000 Da) with a concentration of 10 mg/ml are added into a 20 ml glass bottle, and 50 μl aqueous solution of Sulforhodamine 101 (1 mg/ml) is added while magnetic stirring (at a speed of 500 rpm), the stirring is lasted for 20 minutes to obtain a composite solution of polyelectrolyte and fluorescent dye; 8.4 ml ethanol, 815 μl water and 0.1 ml ammonia water are added into another 20 ml glass bottle, and then 300 TEOS is added at magnetic stirring speed of 200 rpm and timing is started. After 25 minutes, 1 ml composite solution of polyelectrolyt and fluorescent dye is added into Stöber system quickly, the magnetic stirring speed is adjusted to 50 rpm when it becomes homogeneous, the reaction continues till the total reaction time reaches 24 hours.

Different dyes are doped in examples 6~8.

Figure 7:
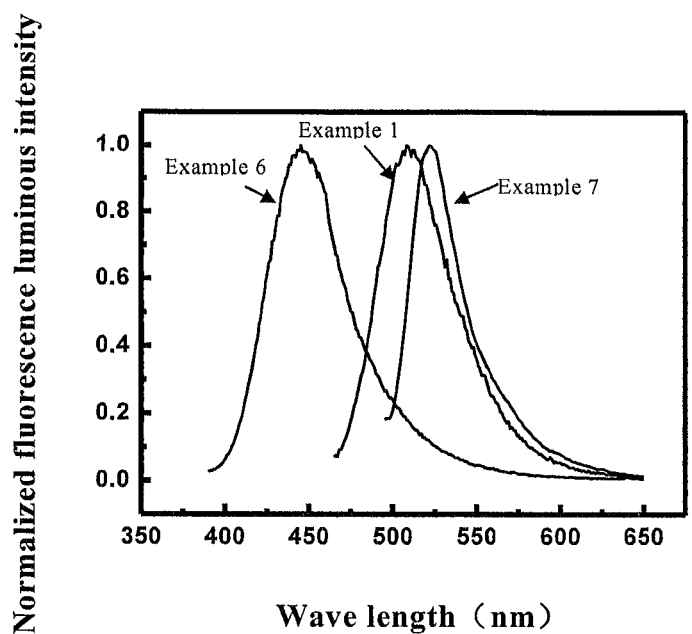
FIG. 7 shows fluorescence spectrum of silica nanoparticles doped with dyes according to example 1, 6 and 7.

FIG. 7, from left to right, shows the fluorescence spectrum of silica nanoparticles doped with different dyes according to examples 1, 6 and 7 respectively.

EXAMPLE 9

0.5 ml ethanol/water mixture (ratio of ethanol to water is 8), 4 ml ethanol and 100 μl PDADMAC aqueous solution (molecular weight is 100,000-200,000 Da) with a concentration of 10 mg/ml are added into a 20 ml glass bottle, and 400 μl HPTS aqueous solution (1 mg/ml) is added while magnetic stirring (at a speed of 500 rpm), the stirring is lasted for 20 minutes to obtain a composite solution of polyelectrolyte and fluorescent dye; 8.4 ml ethanol, 815 μl water and 0.1 ml ammonia water are added into another 20 ml glass bottle, and then 200 μl TEOS is added at magnetic stirring speed of 200 rpm and timing is started. After 25 minutes, 1 ml composite solution of polyelectrolyte and fluorescent dye is added into Stöber system quickly, the magnetic stirring speed is adjusted to 50 rpm when it becomes homogeneous, and the reaction continues till the total reaction time reaches 24 hours.

EXAMPLE 10

0.5 ml ethanol/water mixture (ratio of ethanol to water is 8), 4 ml ethanol and 100 μl PDADMAC aqueous solution (molecular weight is 100,000-200,000 Da) with a concentration of 10 mg/ml are added into a 20 ml glass bottle, and 400 μl HPTS aqueous solution is added while magnetic stirring (at a speed of 500 rpm), the stirring is lasted for 20 minutes to obtain a composite solution of polyelectrolyte and fluorescent dye; 8.4 ml ethanol, 815 μl water and 0.1 ml ammonia water are added into another 20 ml glass bottle, and then 400 μl TEOS is added at magnetic stirring speed of 200 rpm and timing is started. After 25 minutes, 1 ml composite solution of polyelectrolyte and fluorescent dye is added into Stöber system quickly, the magnetic stirring speed is adjusted to 50 rpm when it becomes homogeneous, and the reaction continues till the total reaction time reaches 24 hours.

In examples 9 and 10, the dosages of TEOS are respectively 200 μl and 400 μl with the average particle diameter of their produced particles being 37 nm and 46 nm. The dosage of TEOS can be any value between 200~400 μl. Thus, particles with different sizes can be obtained.

EXAMPLE 11

0.5 ml ethanol/water mixture (ratio of ethanol to water is 8), 4 ml ethanol and 100 μl PDADMAC aqueous solution (molecular weight is 200,000-350,000 Da) with a concentration of 10 mg/ml are added into a 20 ml glass bottle, and 400 μl HPTS aqueous solution (1 mg/ml) is added while magnetic stirring (at a speed of 500 rpm), the stirring is lasted for 20 minutes to obtain a composite solution of polyelectrolyte and fluorescent dye; 8.4 ml ethanol, 815 μl water and 0.1 ml ammonia water are added into another 20 ml glass bottle, and then 300 μl TEOS is added at magnetic stirring speed of 200 rpm and timing is started. After 25 minutes, 1 ml composite solution of polyelectrolyte and fluorescent dye is added into Stöber system quickly, the magnetic stirring speed is adjusted to 50 rpm when it becomes homogeneous, and the reaction continues till the total reaction time reaches 24 hours.

EXAMPLE 12

0.5 ml ethanol/water mixture (ratio of ethanol to water is 8), 4 ml ethanol and 100 μl PDADMAC aqueous solution (molecular weight is 400,000-500,000 Da) with a concentration of 10 mg/ml are added into a 20 ml glass bottle, and 400 μl HPTS aqueous solution is added while magnetic stirring (at a speed of 500 rpm), the stirring is lasted for 20 minutes to obtain the a composite solution of polyelectrolyte and fluorescent dye; 8.4 ml ethanol, 815 μl water and 0.1 ml ammonia water are added into another 20 ml glass bottle, and then 300 μl TEOS is added at magnetic stirring speed of 200 rpm and timing is started. After 25 minutes, 1 ml composite solution of polyelectrolyte and fluorescent dye is added into Stöber system quickly, the magnetic stirring speed is adjusted to 50 rpm when it becomes homogeneous, and the reaction continues till the total reaction time reaches 24 hours.

Examples 1, 11 and 12 adjust the size of the final produced particles by changing the molecular weight of polyelectrolytes which act as template. The average particle diameters of the final produced particles are 50 nm, 80 nm and 100 nm respectively.

EXAMPLE 13

0.5 ml ethanol/water mixture (ratio of ethanol to water is 8), 4 ml ethanol and 100 μl PDADMAC aqueous solution (molecular weight is 100,000-200,000 Da) with a concentration of 10 mg/ml are added into a 20 ml glass bottle, and 400 μl HPTS aqueous solution is added while magnetic stirring (at a speed of 500 rpm), the stirring is lasted for 20 minutes to obtain a composite solution of polyelectrolyte and fluorescent dye; 8.4 ml ethanol, 815 μl water and 0.1 ml ammonia water are added into another 20 ml glass bottle, and then 300 μl TEOS is added at magnetic stirring speed of 200 rpm and timing is started. After 25 minutes, 1 ml composite solution of polyelectrolyte and fluorescent dye is added into Stöber system quickly, the magnetic stirring speed is adjusted to 50 rpm when it becomes homogeneous, and the reaction continues under obturation condition till the total reaction time reaches 12 hours, so as to obtain the silica particles doped with HPTS, with a particle size of about 42 nm.

70 μl of water and 200 μl of TEOS are added into the system, and the reaction is carried out under obturation condition for 12 hours, so as to form a shell with its thickness of about 6 nm and final particle size of 48 nm.

This example take advantage of re-growth means to adjust the particle sizes of the dye-doped silica. During the re-growth process, the dosage of TEOS can be varied from 200~400 μl. The re-growth means can also be used to coat multi-layered silica.

EXAMPLE 14

0.5 ml ethanol/water mixture (ratio of ethanol to water is 8), 4 ml ethanol and 100 μl poly quaternary ammonium salt-7 aqueous solution with a concentration of 10 mg/ml are added into a 20 ml glass bottle, and 400 μl HPTS aqueous solution (1 mg/ml) is added while magnetic stirring (at a speed of 500 rpm), the stirring is lasted for 20 minutes to obtain a composite solution of polyelectrolyte and fluorescent dye; 8.4 ml ethanol, 815 μl water and 0.1 ml ammonia water are added into another 20 ml glass bottle, and then 300 μl TEOS is added at magnetic stirring speed of 200 rpm and timing is started. After 25 minutes, 1 ml composite solution of polyelectrolyte and fluorescent dye is added into Stöber system quickly, the magnetic stirring speed is adjusted to 50 rpm when it becomes homogeneous, and the reaction continues till the total reaction time reaches 24 hours. The obtained spherical silica nanoparticles doped with HPTS are uniform with an average particle diameter of 50±5 nm.

Examples 1 and 14 adopt different polyelectrolyte in quarternary ammonium salts type as template. In this invention, the dosage of other polyelectrolyte as mentioned is the same as that in examples 1 or 14, and the final effects are basically the same.

EXAMPLE 15

2.3 ml ethanol/water mixture (ratio of ethanol to water is 8), 2.4 ml ethanol and 100 μl PDADMAC aqueous solution (molecular weight is 400,000-500,000 Da) with a concentration of 10 mg/ml are added into a 20 ml glass bottle, and 100 μl HPTS aqueous solution (1 mg/ml), 100 μl water solution of Sulforhodamine 101 ($2\times10^{-3}$ M) are added while magnetic stirring (at a speed of 500 rpm), the stirring is lasted for 20 minutes to obtain a composite solution of polyelectrolyte and fluorescent dye; 8.4 ml ethanol, 815 μl water and 0.1 ml ammonia water are added into another 20 ml glass bottle, and then 300 μl TEOS is added at magnetic stirring speed of 200 rpm and timing is started. After 25 minutes, 1 ml composite solution of polyelectrolyte and fluorescent dye is added into Stöber system quickly, the magnetic stirring speed is adjusted to 50 rpm when it becomes homogeneous, and the reaction continues till the total reaction time reaches 24 hours.

EXAMPLE 16

2.3 ml ethanol/water mixture (ratio of ethanol to water is 8), 2.4 ml ethanol and 100 μl PDADMAC water solution with a concentration of 10 mg/ml (and molecular weight of 400,000-500,000 Da) are added into a 20 ml glass bottle, and 100 μl aqueous solution of 7-hydroxy coumarin 4-acetic acid ($2\times10^{-3}$ M), 100 μl aqueous solution of fluorescein sodium salt (1 mg/ml) are added while magnetic stirring (at a speed of 500 rpm), the stirring is lasted for 20 minutes to obtain the polyelectrolyte/fluorescent dye composite solutions; 8.4 ml ethanol, 815 μl water and 0.1 ml ammonia are added into another 20 ml glass bottle, and then 300 μl TEOS is added at magnetic stirring at a speed of 200 rpm and timing is started. After 25 minutes, 1 ml composite solution of polyelectrolyte and fluorescent dye is added into Stöber system quickly, the magnetic stirring speed is adjusted to 50 rpm when it becomes homogeneous, and the reaction continues till the total reaction time reaches 24 hours.

In examples 15 and 16, various dyes are simultaneously doped in the inner core consists of polyelectrolyte and silica. To be specific, various dyes are one or two selected from group consisting of 8-hydroxy-1,3,6-pyrene trisulfonate, 7-hydroxy coumarin 4-acetic acid, fluorescein sodium salts, Sulforhodamine 101, or other negatively charged dyes which are all suitable for doping.

EXAMPLE 17

3.65 ml ethanol/water mixture (ratio of ethanol to water is 8), 1.2 ml ethanol and 100 μl PDADMAC aqueous solution (molecular weight is 100,000-200,000 Da) with a concentration of 10 mg/ml are added into a 20 ml glass bottle, and 50 μl HPTS aqueous solution is added while magnetic stirring (at a speed of 500 rpm), the stirring is lasted for 20 minutes to obtain a composite solution of polyelectrolyte and fluorescent dye; 8.4 ml ethanol, 815 μl water and 0.1 ml ammonia water are added into another 20 ml glass bottle, and then 300 μl TEOS is added at magnetic stirring speed of 200 rpm and timing is started. After 25 minutes, 1 ml composite solution of polyelectrolyte and fluorescent dye is added into Stöber system quickly, the magnetic stirring speed is adjusted to 50 rpm when it becomes homogeneous. The reaction continues for another 2 hours, and then 50 μl Ru(phen)$_3$ (tri-phenanthroline ruthenium) (1 mg/ml) is added for reacting till the total reaction time reaches 22 hours.

Figure 8:
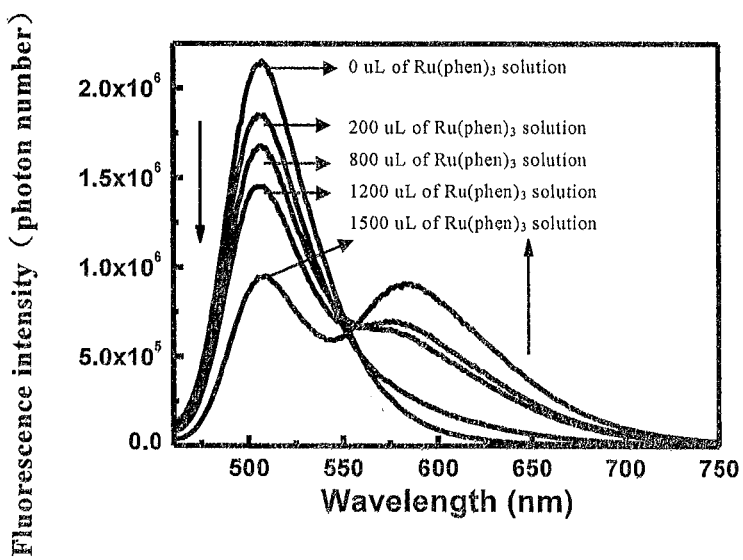
FIG. 8 shows fluorescence spectrum of the produced silica nanoparticles according to example 17, which are doped with different volumes of $Ru(phen)_3$ in their shells, with the composite of PDADMAC and HPTS as core.
Figure 9:
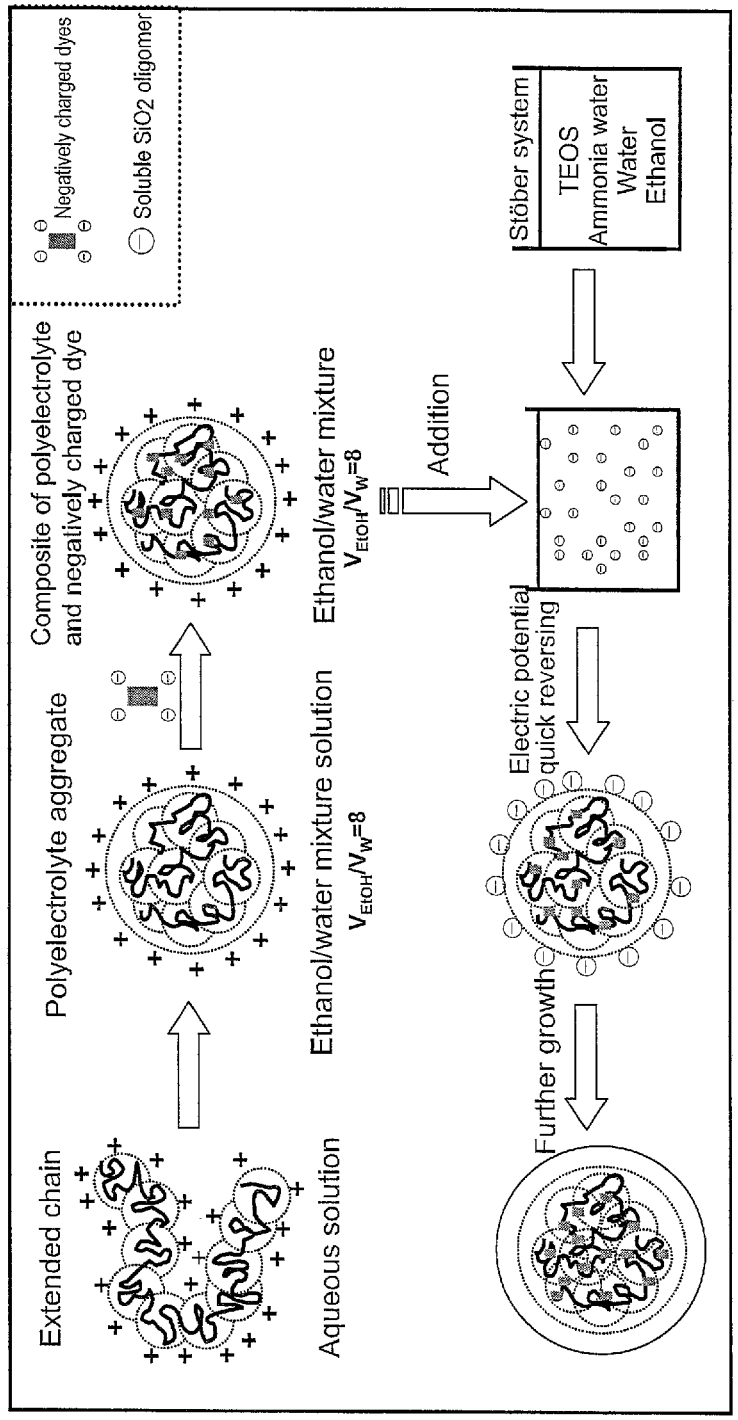
FIG. 9 shows the structure of silica particles doped with negatively charged dyes and its manufacturing flow chart.

Ru(phen)$_3$ solution can be added at any time within the range of 2 to 8 hours after introducing the composite solution of polyelectrolyte and fluorescent dye into the prehydrolyzed Stöber system. The dosage may range from 0 to 2 ml. FIG. 8, along the direction of arrow, shows the fluorescence spectrum of produced particles after adding 0, 200, 800, 1200 and 1500 μl of Ru(phen)$_3$ solutions respectively.

Apart from Ru(phen)$_3$, positively charged phosphorescent dyes could also be Ru(bpy)$_3$ [tris-(2,2'-bipyridine)ruthenium], Ir(pph)$_3$ [tris(2-phenylpyridine)iridium], with their dosages the same as example 17.

EXAMPLE 18

50 μl APS (γ-amino propyltriethoxyl silane) and 1 ml FITC (fluorescein isothiocyanate, 1 mg/ml ethanol solution) are added into a 4 ml absolute ethyl ethanol under obturation condition to react for 12 hours, so as to obtain a precursor solution upon coupling of fluoresceine and silane coupling agent. The method for preparing the precursor solution is common knowledge in prior art. 3.65 ml ethanol/water mixture (ratio of ethanol to water is 8), 1.2 ml ethanol and 100 PDADMAC aqueous solution (molecular weight is 100,000-200,000 Da) with a concentration of 10 mg/ml are added into a 20 ml glass bottle, and 100 μl 7-hydroxy coumarin 4-acetic acid aqueous solution is added while magnetic stirring (at a speed of 500 rpm), the stirring is lasted for 20 minutes to obtain a composite solution of polyelectrolyte and fluorescent dye; 8.4 ml ethanol, 815 μl water and 0.1 ml ammonia water are added into another 20 ml glass bottle, and then 300 μl TEOS is added at magnetic stirring speed of 200 rpm and timing is started. After 25 minutes, 1 ml composite solution of polyelectrolyte and fluorescent dye is added into Stöber system quickly, the magnetic stirring speed is adjusted to 50 rpm when it becomes homogeneous, and the precursor solution is added to continue reacting till the total reaction time reaches 22 hours.

The precursor solution upon coupling of FITC and APS can be added, at any time within the range of 2 to 8 hours after introducing the composite solution of polyelectrolyte and fluorescent dye into the prehydrolyzed Stöber system. The amount of the precursor solution can be 0~2 ml.

Apart from FITC, the fluorescent dyes which can covalently couple could be Rhodamine isothiocyanate (RITC), Rhodamine B isothiocyanate (RBITC), etc. Apart from APS, the silane coupling agent can be γ-aminopropyl methyldimethoxysiliane, 3-aminopropyl triethoxysilane (APTS) etc.

Examples 17 and 18 respectively describe simultaneous application of the method of the invention with doping method of phosphorescent dye through electrostatic force and covalent coupling method.

EXAMPLE 19

680 μl ethanol/water mixture (ratio of ethanol to water is 8), 3.840 ml ethanol and 100 μl PDADMAC aqueous solution (molecular weight is 100,000-200,000 Da) with a concentration of 10 mg/ml are added into a 20 ml glass bottle, and 50 μl HPTS aqueous solution (1 mg/ml), 330 μl disodium EDTA water solution (0.75 mg/ml) are added while magnetic stirring (at a speed of 500 rpm), the stirring is lasted for 20 minutes to obtain a composite solution of polyelectrolyte and fluorescent dye; 8.4 ml ethanol, 815 μl water and 0.1 ml ammonia water are added into another 20 ml glass bottle, and then 300 μl TEOS is added at magnetic stirring speed of 200 rpm and timing is started. After 25 minutes, 1 ml composite solution of polyelectrolyte of fluorescent dye is added into Stöber system quickly, the magnetic stirring speed is adjusted to 50 rpm when it becomes homogeneous, the reaction continues till the total reaction time reaches 24 hours.

Figure 5:
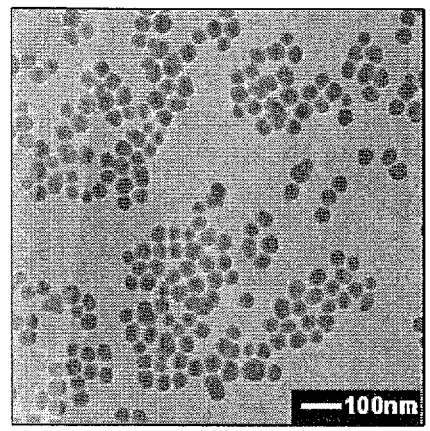
FIG. 5 is a TEM photograph of silica nanoparticles doped with negatively charged dyes using positively charged polyelectrolyte as template according to example 19 in the invention.

As indicated by this example, introducing EDTA disodium salt as an additive can optimize the morphology of produced particles. FIG. 5 is a TEM photograph of silica nanoparticles doped with negatively charged dyes using positively charged polyelectrolyte as template according to this example. By using EDTA or other sodium salts of EDTA, citric acid or sodium salts thereof, to replace disodium EDTA as additive, the effect of optimizing the morphology of final particles can also be achieved.

EXAMPLE 20

0.5 ml ethanol/water mixture (ratio of ethanol to water is 8), 4 ml ethanol and 100 μl PDADMAC aqueous solution (molecular weight is 100,000-200,000 Da) with a concentration of 10 mg/ml are added into a 20 ml glass bottle, and 400 μl HPTS aqueous solution is added while magnetic stirring (at a speed of 500 rpm), the stirring is lasted for 20 minutes to obtain a composite solution of polyelectrolyte and fluorescent dye; 8.4 ml ethanol, 815 μl water and 0.1 ml ammonia water are added into another 20 ml glass bottle, and then 300 μl TEOS is added at magnetic stirring speed of 200 rpm and timing is started. After 15 minutes, 1 ml composite solution of polyelectrolyte and fluorescent dye is added into Stöber system quickly, the magnetic stirring speed is adjusted to 50 rpm when it becomes homogeneous, and the reaction continues till the total reaction time reaches 24 hours. The obtained spherical silica nanoparticles doped with HPTS are uniform with an average particle diameter of 50±5 nm.

As compared to example 1, this example merely differs in the reaction time after adding organosilicon source. The final result remains the same.

EXAMPLE 21

0.5 ml ethanol/water mixture (ratio of ethanol to water is 8), 4 ml ethanol and 100 μl PDADMAC aqueous solution (molecular weight is 100,000-200,000 Da) with a concentration of 10 mg/ml are added into a 20 ml glass bottle, and 400 μl HPTS aqueous solution (1 mg/ml) is added while magnetic stirring (at a speed of 500 rpm), the stirring is lasted for 10 minutes to obtain a composite solution of polyelectrolyte and fluorescent dye; 8.4 ml ethanol, 815 μl water and 0.1 ml ammonia water are added into another 20 ml glass bottle, and then 300 μl TEOS is added at magnetic stirring speed of 200 rpm and timing is started. After 15 minutes, 1 ml composite solution of polyelectrolyte and fluorescent dye is added into Stöber system quickly, the magnetic stirring speed is adjusted to 50 rpm when it becomes homogeneous, and the reaction continues till the total reaction time reaches 24 hours. The obtained spherical silica nanoparticles doped with HPTS are uniform with an average particle diameter of 50±5 nm.

As compared to example 1, this example merely differs in the stirring time after adding fluorescent dyes. The produced nanoparticles still meet the requirements. In order to make the dyes uniformly disperse in the polyelectrolyte aggregates, the stirring time should be at least 10 minutes, with which, results conform to requirements can be achieved.

EXAMPLE 22

4.055 ml ethanol/water mixture (ratio of ethanol to water is 8), 840 μl ethanol and 100 μl PDADMAC aqueous solution (molecular weight is 100,000-200,000 Da) with a concentration of 10 mg/ml are added into a 20 ml glass bottle, and 5μl HPTS aqueous solution (1 mg/ml) is added while magnetic stirring (at a speed of 500 rpm), the stirring is lasted for 20 minutes to obtain a composite solution of polyelectrolyte and fluorescent dye; 8.4 ml ethanol, 815 μl water and 0.1 ml ammonia water are added into another 20 ml glass bottle, and then 300 ml TEOS is added at magnetic stirring speed of 200 rpm and timing is started. After 25 minutes, 1 ml composite solution of polyelectrolyte and fluorescent dye is added into Stöber system quickly, the magnetic stirring speed is adjusted to 50 rpm when it becomes homogeneous, and the reaction continues till the total reaction time reaches 24 hours.

In this example, the charge molar ratio of fluorescent dye to polyelectrolyte (i.e., doping amount of dyes), is 0.0062:1. The produced particles also have core-shell structure as examples 1-4.

EXAMPLE 23

1.85 ml ethanol/water mixture (ratio of ethanol to water is 8), 2.8 ml ethanol and 100 μl PDADMAC aqueous solution (molecular weight is 100,000-200,000 Da) with a concentration of 10 mg/ml are added into a 20 ml glass bottle, and 250 μl HPTS aqueous solution is added while magnetic stirring (at a speed of 500 rpm), the stirring is lasted for 20 minutes to obtain a composite solution of polyelectrolyte and fluorescent dye; 8.4 ml ethanol, 815 μl water and 0.1 ml ammonia water are added into another 20 ml glass bottle, and then 300 μl TEOS is added at magnetic stirring speed of 200 rpm and timing is started. After 25 minutes, 1 ml composite solution of polyelectrolyte and fluorescent dye is added into Stöber system quickly, the magnetic stirring speed is adjusted to 50 rpm when it becomes homogeneous, and the reaction continues till the total reaction time reaches 24 hours. The obtained spherical silica nanoparticles doped with HPTS are uniform with an average particle diameter of 50±5 nm.

In this example, the doping amount of fluorescent dye is 0.62. Like all silica nanoparticles with doping amount of dyes in the range of 0.25-0.62, the uniformity is good.

What is claimed is:

1. A silica nanoparticle doped with negatively charged dyes using positively charged polyelectrolyte as template, which has a shell-core structure, wherein the inner core comprises:
   positively charged polyelectrolyte aggregates, in which fluorescent dyes with negative charge and SiO2 are doped, and optional additives having negative charges;
   the shell consists of SiO2; and
   wherein the sum of the amount of negative charges carried by the additives and the fluorescent dyes is less than amount of the positive charges carried by the polyelectrolyte aggregates.

2. The silica nano-particle doped with negatively charged dyes using positively charged polyelectrolyte as template according to claim 1, wherein the polyelectrolyte aggregate comprises:
   poly (diallyl dimethyl ammonium chloride);
   poly-quaternary ammonium salt-7; or
   poly-quaternary ammonium salt-2.

3. The silica nano-particle doped with negatively charged dyes using positively charged polyelectrolyte as template according to claim 1, wherein the polyelectrolyte comprises:
   a molecular weight of 100,000-500,000 Da.

4. The silica nano-particle doped with negatively charged dyes using positively charged polyelectrolyte as template according to claim 1, wherein the additive comprises:
   ethylenediamine tetracetic acid;
   citric acid; or
   sodium salts of them.

5. The silica nano-particle doped with negatively charged dyes using positively charged polyelectrolyte as template according to claim 1, wherein the fluorescent dye is one or two selected from the group consisting of:
   8-hydroxy-1, 3, 6-pyrene trisulfonate;
   7-hydroxy coumarin 4-acetic acid;
   fluorescein sodium salts;
   Sulforhodamine 101.

6. The silica nano-particle doped with negatively charged dyes using positively charged polyelectrolyte as template according to claim 1, wherein the charge molar ratio of sum of the amount of negative charges carried by the fluorescent dye and the additive to amount of the positive charges carried by the polyelectrolyte is more than 0, but less than or equal to 0.62:1.

7. A method for preparing silica nanoparticles doped with negatively charged dyes by using positively charged polyelectrolyte as template, comprises the following steps:
   1) preparation of composite solution of polyelectrolyte and fluorescent dye:
   adding positively charged polyelectrolyte solution into ethanol/water mixture and adding negatively charged fluorescent dye solution while stirring, so as to obtain a composite solution of polyelectrolyte and fluorescent dye, wherein the amount of negative charges carried by the fluorescent dye is less than that of the positive charges carried by the polyelectrolyte aggregates;
   2) prehydrolysis of organosilicon source: adding ethanol, water and ammonia water into another container, adding siloxane while stirring to form a prehydrolysis system of siloxane; and
   3) coating with organosilicon source: adding the composite solution of polyelectrolyte and fluorescent dye obtained from step 1) into the prehydrolysis system of siloxane obtained from step 2), continuing reacting while stirring, so as to obtain silica nanoparticles doped with negatively charged dyes by using positively charged polyelectrolyte as template.

8. The method for preparing silica nanoparticles doped with negatively charged dyes by using positively charged polyelectrolyte as template according to claim 7, wherein the volume ratio of ethanol to water in the composite solution of polyelectrolyte and fluorescent dye in the step 1) is 7~10.

9. The method for preparing silica nanoparticles doped with negatively charged dyes by using positively charged polyelectrolyte as template according to claim 7, wherein the mass concentration of the polyelectrolyte solution in the step 1) is 0.1~0.4mg/ml.

10. The method for preparing silica nanoparticles doped with negatively charged dyes by using positively charged polyelectrolyte as template according to claim 7, wherein the process of preparing the composite solution of polyelectrolyte and fluorescent dye in the step 1), further comprises:
    adding negatively charged additives, in which the total mole number of negative charges carried by the additives and the fluorescent dyes is less than mole number of the positive charges carried by the polyelectrolyte.

11. The method for preparing silica nanoparticles doped with negatively charged dyes by using positively charged polyelectrolyte as template according to claim 10, wherein the charge molar ratio of the sum of the mole number of the negative charges carried by the fluorescent dyes and the additives to the mole amount of the positive charges carried by the polyelectrolyte is more than 0, but less than or equal to 0.62:1.

12. The method for preparing silica nanoparticles doped with negatively charged dyes by using positively charged polyelectrolyte as template according to claim 7, wherein the concentration of NH3 of the prehydrolysis system in the step 2) is 0.14mol/L, and prehydrolysis time is 15~25 minutes.

13. The method for preparing silica nanoparticles doped with negatively charged dyes by using positively charged polyelectrolyte as template according to claim 7, wherein the molar ratio of ethanol, water, ammonia water and siloxane in the prehydrolysis system of the step 2) is 161:55:1.5:1~2.

14. The method for preparing silica nanoparticles doped with negatively charged dyes by using positively charged polyelectrolyte as template according to claim 7, wherein the molar ratio of siloxane in the prehydrolysis system of the step 3) to the polyelectrolyte in the added composite solution is 720:1~1440:1.

15. The method for preparing silica nanoparticles doped with negatively charged dyes by using positively charged polyelectrolyte as template according to claim 7, wherein the stirring time after adding the fluorescent dyes in the step 1) is 20 minutes.

16. The method for preparing silica nanoparticles doped with negatively charged dyes by using positively charged polyelectrolyte as template according to claim 7, wherein the reaction of the step 3) is conducted under obturation condition.

17. The method for preparing silica nanoparticles doped with negatively charged dyes by using positively charged polyelectrolyte as template according to claim 7, wherein the coating organic silica source in the step 3 further comprises:

adding the composite solution of polyelectrolyte and fluorescent dye into the prehydrolysis system of siloxane;
reacting while stirring for 2-8 hours; then
adding positively charged phosphorescent dyes; and
continuing reacting while stirring, so as to achieve doping of fluorescent dyes and phosphorescent dyes in layered way.

18. The method for preparing silica nanoparticles doped with negatively charged dyes by using positively charged polyelectrolyte as template according to claim 7, wherein the step of coating with organosilicon source further includes:
adding the composite solution of polyelectrolyte and fluorescent dye into the prehydrolysis system of siloxane;
reacting while stirring for 2-8 hours;
adding precursor solution obtained from the coupling reaction of couplable fluorescent dyes and silane coupling agent; and
continuing reacting while stirring, so as to achieve doping of fluorescent dyes and couplable fluorescent dyes in layered way.

19. The silica nano-particle doped with negatively charged dyes using positively charged polyelectrolyte as template according to claim 1, wherein the charge molar ratio of sum of the amount of negative charges carried by the fluorescent dye and the additive to amount of the positive charges carried by the polyelectrolyte is 0.25:1~0.62:1.

20. The method for preparing silica nanoparticles doped with negatively charged dyes by using positively charged polyelectrolyte as template according to claim 7, wherein the mass concentration of the polyelectrolyte solution in the step 1) is 0.2mg/ml.

21. The method for preparing silica nanoparticles doped with negatively charged dyes by using positively charged polyelectrolyte as template according to claim 10, wherein the charge molar ratio of the sum of the mole number of the negative charges carried by the fluorescent dyes and the additives to the mole amount of the positive charges carried by the polyelectrolyte is 0.25:1~0.62:1.

* * * * *

UNITED STATES PATENT AND TRADEMARK OFFICE
CERTIFICATE OF CORRECTION

PATENT NO. : 9,068,084 B2
APPLICATION NO. : 13/574171
DATED : June 30, 2015
INVENTOR(S) : Wensheng Yang, Jinglun Liang and Jun Li Page 1 of 1

It is certified that error appears in the above-identified patent and that said Letters Patent is hereby corrected as shown below:

Assignee Data is missing. Please add the following to the patent: JILIN UNIVERSITY, CHINA.

Signed and Sealed this
Twenty-eighth Day of June, 2016

Michelle K. Lee
*Director of the United States Patent and Trademark Office*